United States Patent
Jang

(10) Patent No.: US 9,616,377 B2
(45) Date of Patent: Apr. 11, 2017

(54) PORTABLE DRY SCRUBBER

(71) Applicant: Hyun Wook Jang, Austin, TX (US)

(72) Inventor: Hyun Wook Jang, Austin, TX (US)

( * ) Notice: Subject to any disclaimer, the term of this patent is extended or adjusted under 35 U.S.C. 154(b) by 404 days.

(21) Appl. No.: 14/484,183

(22) Filed: Sep. 11, 2014

(65) Prior Publication Data

US 2016/0074802 A1    Mar. 17, 2016

(51) Int. Cl.
*B01D 53/02* (2006.01)
*B01D 53/04* (2006.01)

(52) U.S. Cl.
CPC ...... *B01D 53/0407* (2013.01); *B01D 53/0454* (2013.01); *B01D 2257/2025* (2013.01); *B01D 2257/2027* (2013.01); *B01D 2257/2045* (2013.01); *B01D 2257/2047* (2013.01); *B01D 2257/304* (2013.01); *B01D 2257/406* (2013.01); *B01D 2257/502* (2013.01); *B01D 2258/0216* (2013.01); *B01D 2259/455* (2013.01)

(58) Field of Classification Search
CPC .... B01D 2257/2025; B01D 2257/2027; B01D 2257/2045; B01D 2257/2047; B01D 2257/304; B01D 2257/406; B01D 2257/502; B01D 2258/0216; B01D 2259/455; B01D 53/0407; B01D 53/0454
See application file for complete search history.

(56) References Cited

U.S. PATENT DOCUMENTS

| | | | | |
|---|---|---|---|---|
| 5,009,869 A * | 4/1991 | Weinberg | ............. | B01D 53/326 205/687 |
| 5,207,877 A * | 5/1993 | Weinberg | ............. | B01D 53/326 205/696 |
| 5,417,729 A * | 5/1995 | Greenleaf, Sr. | ...... | B01D 46/001 55/350.1 |
| 5,890,367 A * | 4/1999 | You | .......................... | F24F 3/161 454/187 |
| 5,955,037 A * | 9/1999 | Holst | ..................... | B01D 47/06 406/193 |
| 2005/0089455 A1* | 4/2005 | Marganski | ......... | B01D 53/0415 422/168 |
| 2009/0205495 A1* | 8/2009 | Johnsgard | ............. | B01D 53/68 95/227 |
| 2009/0261218 A1* | 10/2009 | Dellach | ................... | F16B 47/00 248/205.9 |

* cited by examiner

*Primary Examiner* — Christopher P Jones
(74) *Attorney, Agent, or Firm* — Chanmin Park

(57) ABSTRACT

A portable dry scrubber comprises a gas flow control module comprising a gas receiving unit that receives inflow of gas from surrounding atmosphere or from a gas source, a gas processing module that removes hazardous matter from the gas flowed in through the gas receiving unit and a connection module that connects the gas flow control module detachably to the gas processing module. The connection module comprises quick coupling device that establishes and disassembles a gas flow passage between the gas flow control module and the gas processing module. Example of the quick coupling device is a quick release vacuum flange that engages with a connecting flange of the gas flow control module.

5 Claims, 10 Drawing Sheets

PORTABLE DRY SCRUBBER

FIELD OF THE INVENTION

The present invention is related to a portable dry scrubber. More specifically, the present invention is related to a portable dry scrubber that facilitates secure maintenance of semiconductor manufacturing equipment including chamber cleaning.

BACKGROUND OF THE INVENTION

In many industries like semiconductor manufacturing, treating small quantity of gas including toxic, hazardous materials is frequently necessary. Portable dry scrubbers are used to cope with such situations and remove hazardous materials before the gas stream is discharged to the atmosphere. Efficiency and reliability for preparing, moving, setting up, and maintaining a portable dry scrubber are the key factors for the performance of a portable dry scrubber.

BRIEF SUMMARY OF THE INVENTION

An objective of the present invention is to provide a portable dry scrubber, for which it is easy to replace the disposable elements.

Another objective of the present invention is to provide a portable dry scrubber having modular construction that can be adapted to cope with various kinds of emergencies that may occur at semiconductor manufacturing plants.

In order to achieve the objectives, the present invention provides a portable dry scrubber comprising a gas flow control module comprising a gas receiving unit that is adapted to receive inflow of gas from surrounding atmosphere or from a gas source, wherein the inflow of gas contains hazardous materials; a gas processing module that removes hazardous matter from the gas flowed in through the gas receiving unit; and a connection module that connects the gas flow control module detachably to the gas processing module.

The gas processing module comprises a hazardous matter removing unit that removes hazardous matter from the gas that passes through the hazardous matter removing unit.

The connection module comprises a quick coupling device that establishes and disassembles a gas flow passage between the gas flow control module and the gas processing module.

Preferably, the quick coupling device comprises a quick release vacuum flange. The gas receiving unit comprises a connecting flange that engages with the quick release vacuum flange.

The gas flow control module comprises a substantially rectangular control case. The gas processing module comprises a substantially rectangular processing case that comprises a top panel, a bottom panel and four side panels that connect the top panel and the bottom panel.

The connection module further comprises a plurality of protrusions that engage with the control case.

The hazardous matter removing unit comprises one or more beds of adsorbents, wherein the adsorbents remove $SiCl_2H_2$, $SiH_4$, $NH_3$, $AsH_3$, $PH_3$, $BF_3$, $ClF_3$, TEOS, CO, $BCl_3$, $Cl_2$, HBr, HCl, or HF.

The gas processing module further comprises a periodic maintenance port that allows access into the gas processing module, a buffer zone that comprises a plenum adjacent to the beds of adsorbents, and a ULPA filter, wherein the gas flowed into the gas processing module via the vacuum flange flows through the buffer zone, the beds of adsorbents, the UPLA filter and is exhausted from the gas processing module.

The gas receiving unit comprises an articulating arm hood, one or more gas flow-in ports and a gas suction pump, wherein the gas suction pump sucks gas through the arm hood or the gas flow-in ports.

Preferably, the gas flow-in ports have different diameters.

The gas processing module further comprises a gas detecting view port provided on the side panel. The gas detecting view port allows watching the state of adsorbents in the beds of adsorbents.

The gas receiving unit further comprises a powder strainer, wherein gas that flows in through the arm hood or the gas flow-in ports flows through the powder strainer, a first connection pipe that passes the gas out of the powder strainer into the gas suction pump, a second connection pipe that passes the gas out of the gas suction pump into the hazardous matter removing unit.

The gas receiving unit further comprises a by-pass pipe and a by-pass 3 way valve, wherein the by-pass 3 way valve controls the flow inside the gas receiving unit to occur along the first connection pipe and the second connection pipe, along the first connection pipe and the by-pass pipe, or along the by-pass pipe and the second connection pipe.

The gas flow control module further comprises an electric control device that controls the operation of the gas receiving unit. The electric control device has an alarm device that monitors extraordinary situation and emits a warning alarm when extraordinary situation is detected. The extraordinary situation monitored by the alarm device comprises pressure drop, time out or inverter trip.

Performance characteristics of the portable dry scrubber according to the present invention are explained below.

The portable dry scrubber detects and removes toxic gases ($Cl_2$, $BCl_3$, $NH_3$) in confined space, and also removes volatile organic compounds (VOC). The portable dry scrubber removes chemical leakage and odor from local area. In emergency situations, such as a toxic gas leak, the portable dry scrubber can be used for short time to cope with the emergency. The portable dry scrubber can selectively collect pollution and contaminants depending on an area. Examples of contaminants include $Cl_2$, $BCl_3$, HF, HCl, $F_2$, $NH_3$, $H_2S$, $CH_3SH$, NaOH, $CCl_4$, etc.

Using the portable dry scrubber only clean air (not dirt or polluted air) is filtered through the ULPA filter and exhausted to the clean room. The portable dry scrubber does not exhaust contaminated air out, and maintains the balance of the air in clean room. With the compact and modular construction, the portable dry scrubber can be used in any space in the clean room, especially directly on process equipment. The portable dry scrubber can be installed as either stationary or mobile. It can be used and moved throughout clean room. Alternatively, in confined spaces, it can be installed as stationary equipment.

An operator can use the portable dry scrubber for photo resist (PR) process that occur after replacement of VOC removal, removal of odors caused by Bowl Change in periodical maintenance (PM), removal of odors caused by equipment trouble/chemical leak (Metal Organic Chemical Vapor Deposition (MOCVD), Photo, Wet Etch, Chemical Vapor Deposition (CVD), Etch, Diffusion (Diff) and etc.)

An engineer can use the portable dry scrubber to remove odor that occurs during replacement of PR, Edge Bead Removal (EBR), Developer, and Hexa Methyl Disilazane (HMDS) filter, to prevent spread of VOC during replacement of chemical filter of wet etching, to prevent spread of expected gas leaks during replacement and modification of gas line in chamber of equipment, and to prevent spread of particle during chamber cleaning.

Other uses of the portable dry scrubber includes removal of odor in tight and restricted spaces (ex: Chemical Mechanical Polishing (CMP), parts cleaning room, and etc.).

The portable dry scrubber can be used to extract fume that is generated at soldering or welding, and to treat toxic gas. The portable dry scrubber can quickly remove toxic fume at gas leak accidents using the multiple ports.

BRIEF DESCRIPTION OF THE DRAWINGS

The invention will be more fully understood by reference to the detailed description in conjunction with the following figures, wherein.

DETAILED DESCRIPTION OF THE INVENTION

Figure 1:
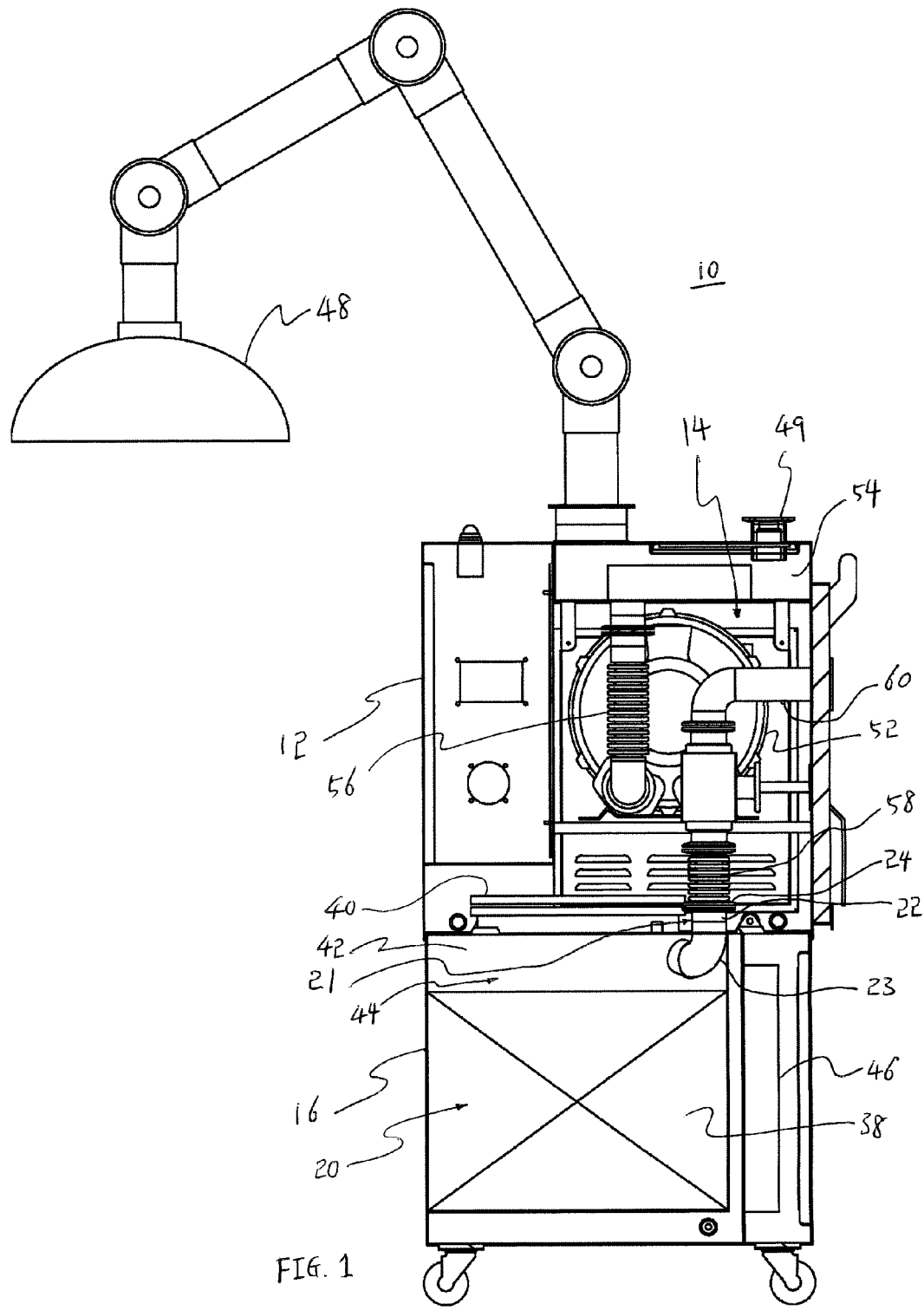
FIG. 1 is an elevation view of a portable dry scrubber according to the present invention.
Figure 2:
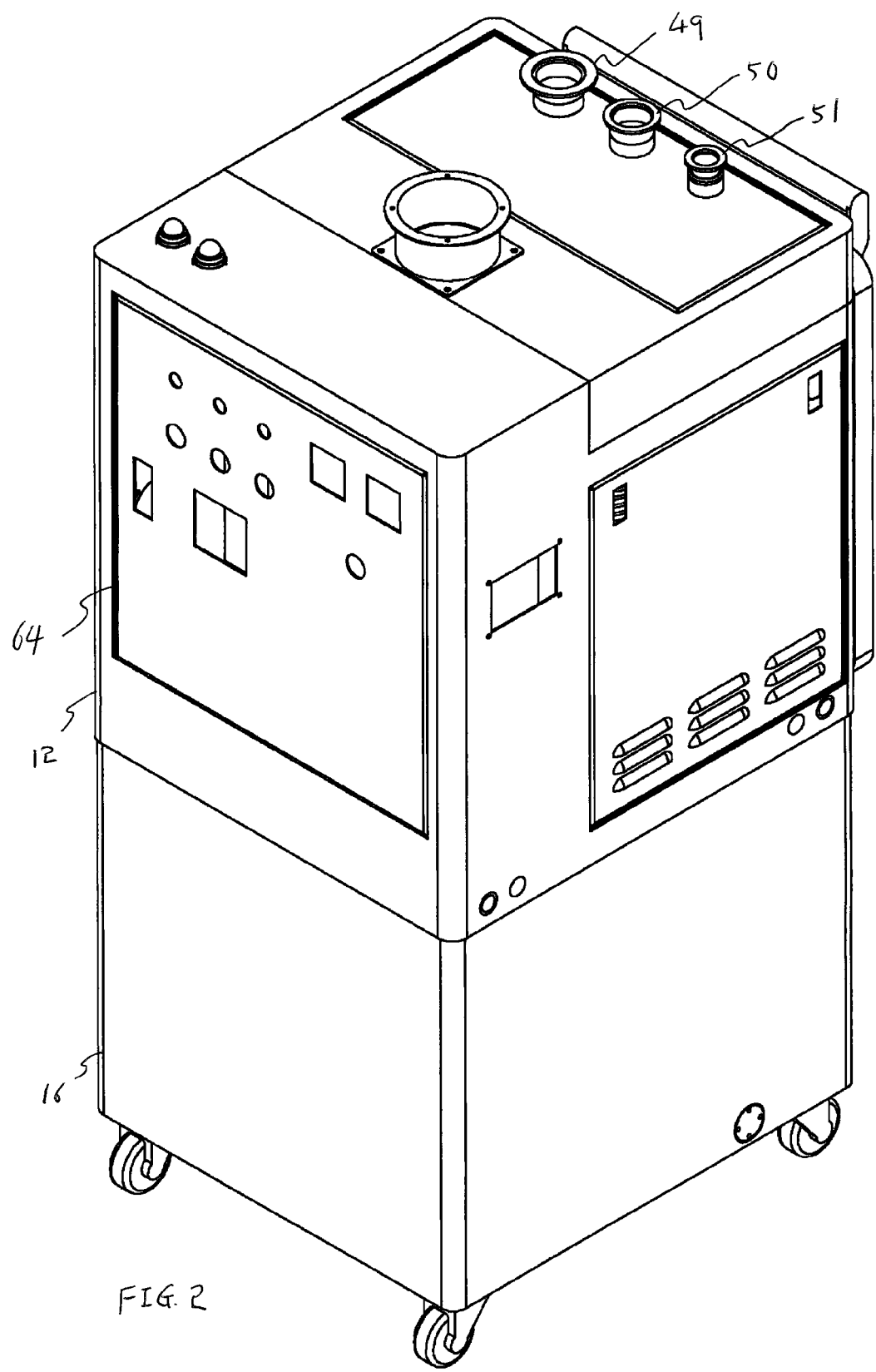
FIG. 2 is a perspective view of the portable dry scrubber.

Referring to FIGS. 1 and 2, a portable dry scrubber 10 comprises a gas flow control module 12, which comprises a gas receiving unit 14 that is adapted to receive inflow of gas, which contains hazardous materials, from surrounding atmosphere or from a gas source; a gas processing module 16 that removes hazardous matter from the gas flowed in through the gas receiving unit 14; and a connection module 18 (refer to FIG. 5) that connects the gas flow control module 12 detachably to the gas processing module 16.

The gas processing module 16 comprises a hazardous matter removing unit 20 that removes hazardous matter from the gas that passes through the hazardous matter removing unit 20.

Figure 5:
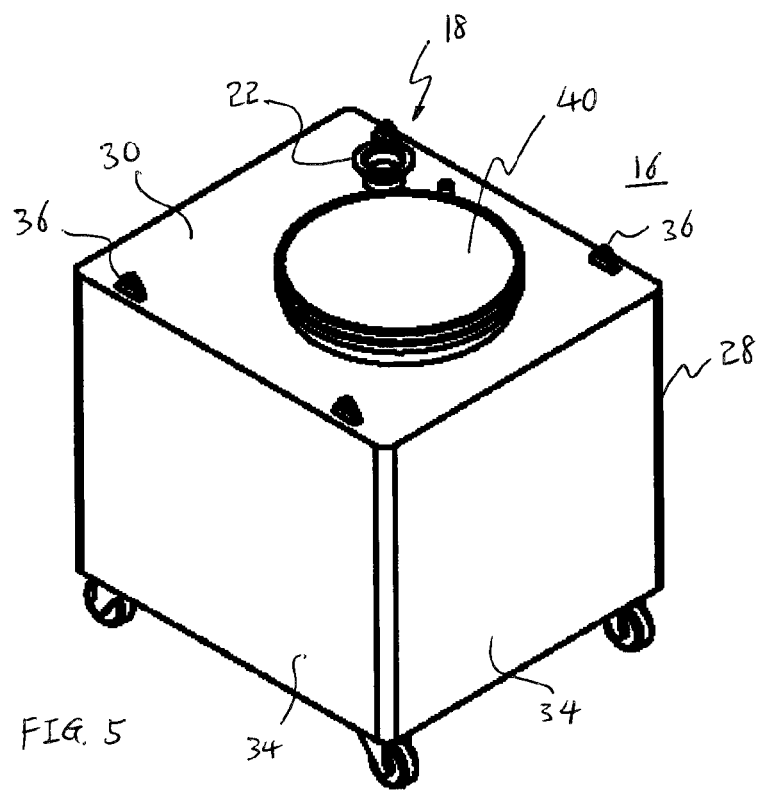
FIG. 5 is a perspective view of a gas processing module.

Referring to FIGS. 1 and 5, the connection module 18 comprises a quick coupling device 21 that establishes and disassembles a gas flow passage 23 between the gas flow control module 12 and the gas processing module 16.

The quick coupling device 21 comprises a quick release vacuum flange 22. The gas receiving unit 14 comprises a connecting flange 24 that engages with the quick release vacuum flange 22.

Figure 3:
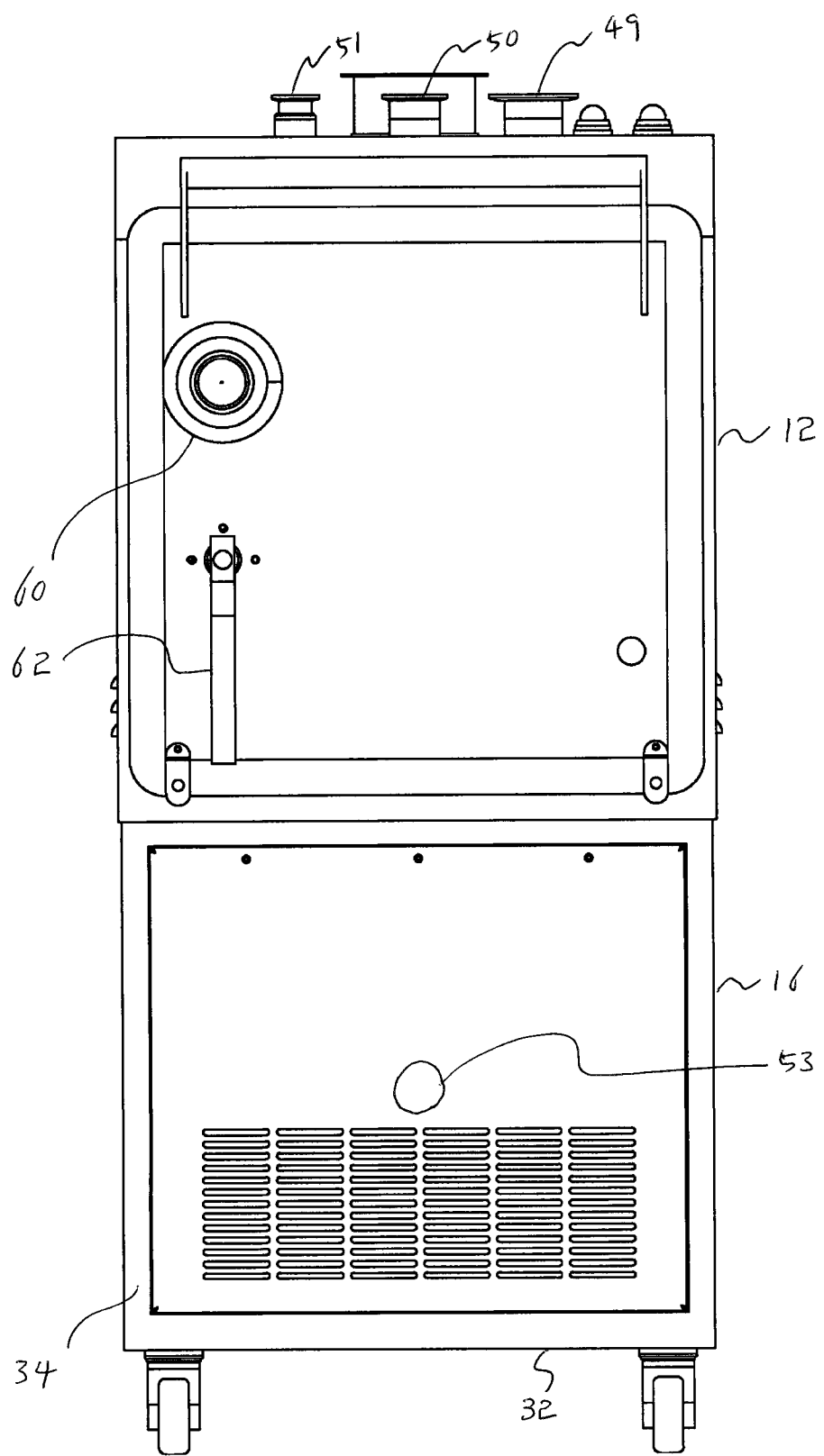
FIG. 3 is a side elevation view of the portable dry scrubber.
Figure 4:
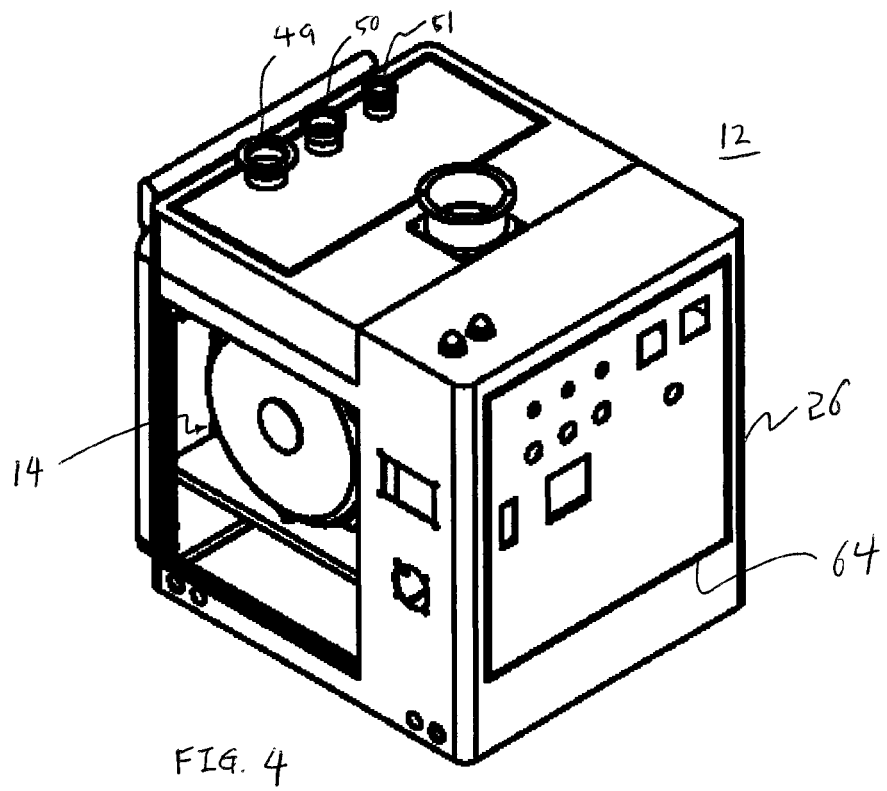
FIG. 4 is a perspective view of a gas flow control module.

Referring to FIGS. 4 and 5, the gas flow control module 12 comprises a substantially rectangular control case 26. The gas processing module 16 comprises a substantially rectangular processing case 28 that comprises a top panel 30, a bottom panel 32 (refer to FIG. 3) and four side panels 34 that connect the top panel 30 and the bottom panel 32.

The connection module 18 further comprises a plurality of protrusions 36 that engage with the control case 26. The protrusions 36 facilitate aligning of the gas flow control module 12 with the gas processing module 16 when the gas processing module 16 needs to be reassembled to the gas flow control module 12.

Referring to FIG. 1, the hazardous matter removing unit 20 comprises one or more beds of adsorbents 38, wherein the adsorbents 38 remove $SiCl_2H_2$, $SiH_4$, $NH_3$, $AsH_3$, $PH_3$, $BF_3$, $ClF_3$, TEOS, CO, $BCl_3$, $Cl_2$, HBr, HCl, or HF.

The gas processing module 16 further comprises a periodic maintenance port 40 that allows access into the gas processing module 16, a buffer zone 42 that comprises a plenum 44 adjacent to the beds of adsorbents 38, and a ULPA filter 46. The gas flowed into the gas processing module 16 via the vacuum flange 22 flows through the buffer zone 42, the beds of adsorbents 38, the UPLA filter 46, and is exhausted from the gas processing module 16.

The quick coupling device 21 facilitates setting up and disassembling of gas passage between the gas flow control module 12 and the gas processing module 16. The gas passage is broken up when the gas processing module 16 needs to be replaced due to saturation of adsorbents, etc., and is formed again when the gas processing module 16 with new adsorbents is ready.

When the gas processing module 16, which has the role of a canister enclosing elements for removing hazardous materials, needs to be replaced, the quick release vacuum flange 22 is released first, bolts (not shown) are pulled, the gas flow control module 12 is lifted, and then the gas processing module 16 is taken off.

The gas receiving unit 14 comprises an articulating arm hood 48 (refer to FIG. 1), three gas flow-in ports 49, 50, 51 (refer to FIG. 2) and a gas suction pump 52. The gas suction pump 52 sucks gas through the arm hood 48 or one of the gas flow-in ports 49, 50, 51. The arm hood 48 can be articulated to various positions to get close to a gas leaking point. In this embodiment, the arm hood 48 has 75 mm diameter, and 1,300 mm length. The gas suction pump includes a ring blower (1400 mm $H_2O$), 2.9 $M^3$/min).

The gas flow-in ports 49, 50, 51 have different diameters. In this embodiment, the ports include NW25, NW40 and NW50. With this construction, the portable dry scrubber 10 can be readily connected to equipments having different dimensions.

Referring to FIG. 3, the gas processing module 16 further comprises a gas detecting view port 53 provided on the side panel 34. The gas detecting view port 53 allows watching the state of adsorbents in the beds of adsorbents 38.

Referring to FIG. 1, the gas receiving unit 14 further comprises a powder strainer 54, wherein gas that flows in through the arm hood 48 or the gas flow-in ports 49, 50, 51 flows through the powder strainer 54, a first connection pipe 56 that passes the gas out of the powder strainer 54 into the gas suction pump 52, a second connection pipe 58 that passes the gas out of the gas suction pump 52 into the hazardous matter removing unit 20.

The gas receiving unit 20 further comprises a by-pass pipe 60 and a by-pass 3 way valve 62, wherein the by-pass 3 way valve 62 controls the flow inside the gas receiving unit 20 to occur along the first connection pipe 56 and the second connection pipe 58, along the first connection pipe 56 and the by-pass pipe 60, or along the by-pass pipe 60 and the second connection pipe 58. The by-pass 3 way valve makes it possible to use the gas flow control module 12 and the gas processing module 18 independently. Depending on situations, each of them can be combined with an external device.

Figure 10:
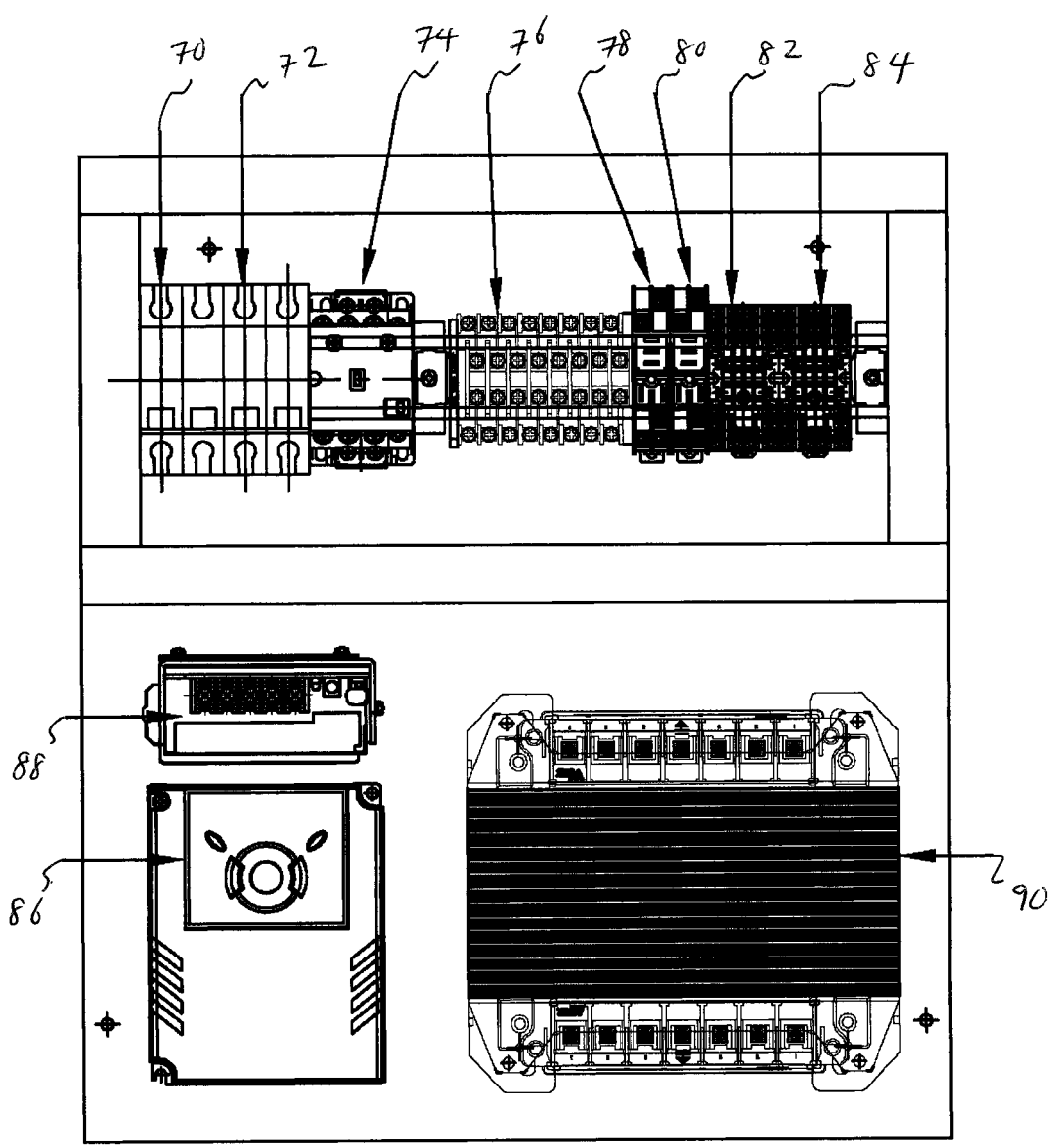
FIG. 10 is an elevation view of elements of the electric control device.
Figure 11:
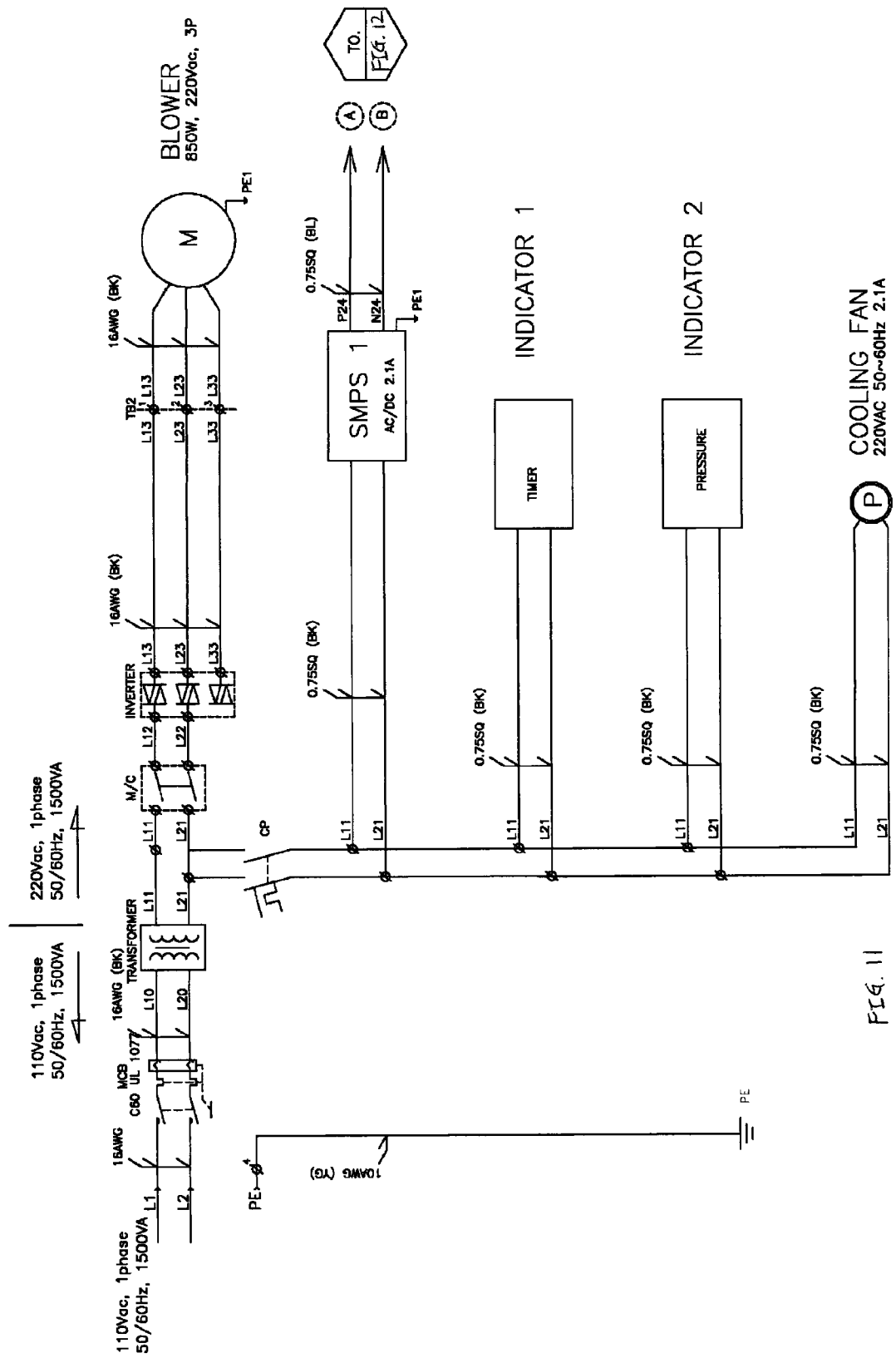
FIGS. 11 and 12 are circuit diagrams for the electric control device.
Figure 12:
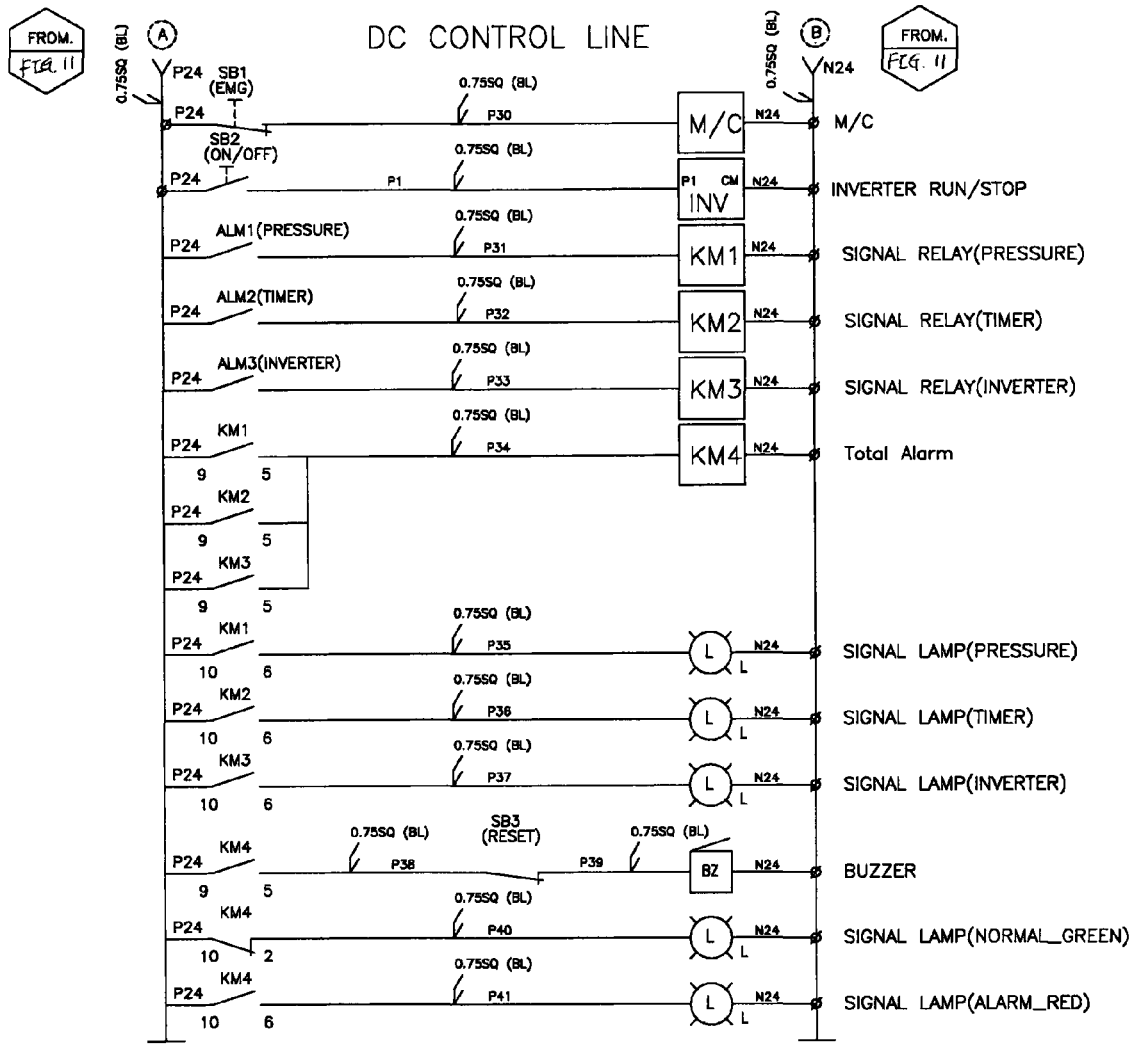

Referring to FIGS. 9~12, the gas flow control module 12 further comprises an electric control device 64 that controls the operation of the gas receiving unit 14. The electric control device 64 has an alarm device 66 that monitors extraordinary situation and emits a warning alarm when extraordinary situation is detected. The extraordinary situation monitored by the alarm device 66 comprises pressure drop 92, time out 94 and inverter trip 96, a buzzer 106, and a buzzer stop/reset switch 104. The electric control device 64 further comprises a timer 98, a pressure indicator 100, a power switch 102, an emergency stop switch 108, and an inverter 110. The electric control device 64 enables prompt identification of problems and actions to solve them. FIG. 10 shows that the electric control device 64 comprises modular components including a main circuit breaker (MCB) 70, a circuit protect (CP) 72, a magnetic circuit breaker (M/C) 74, relays 78, 80, 82, 84, an inverter 86, a DC power supply 88, and a transformer 90.

Figure 6:
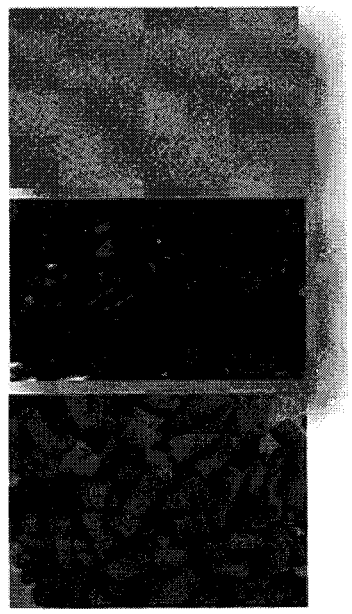
FIG. 6 is a photograph showing adsorbents.

FIG. 6 shows three kinds of adsorbents. In this embodiment, the adsorbents are Puresorb NA-103, Puresorb AA-101, and Puresorb AA-102 from top to bottom. The status change of the adsorbents is visible through the gas detecting view port 53.

Figures 7, 8:
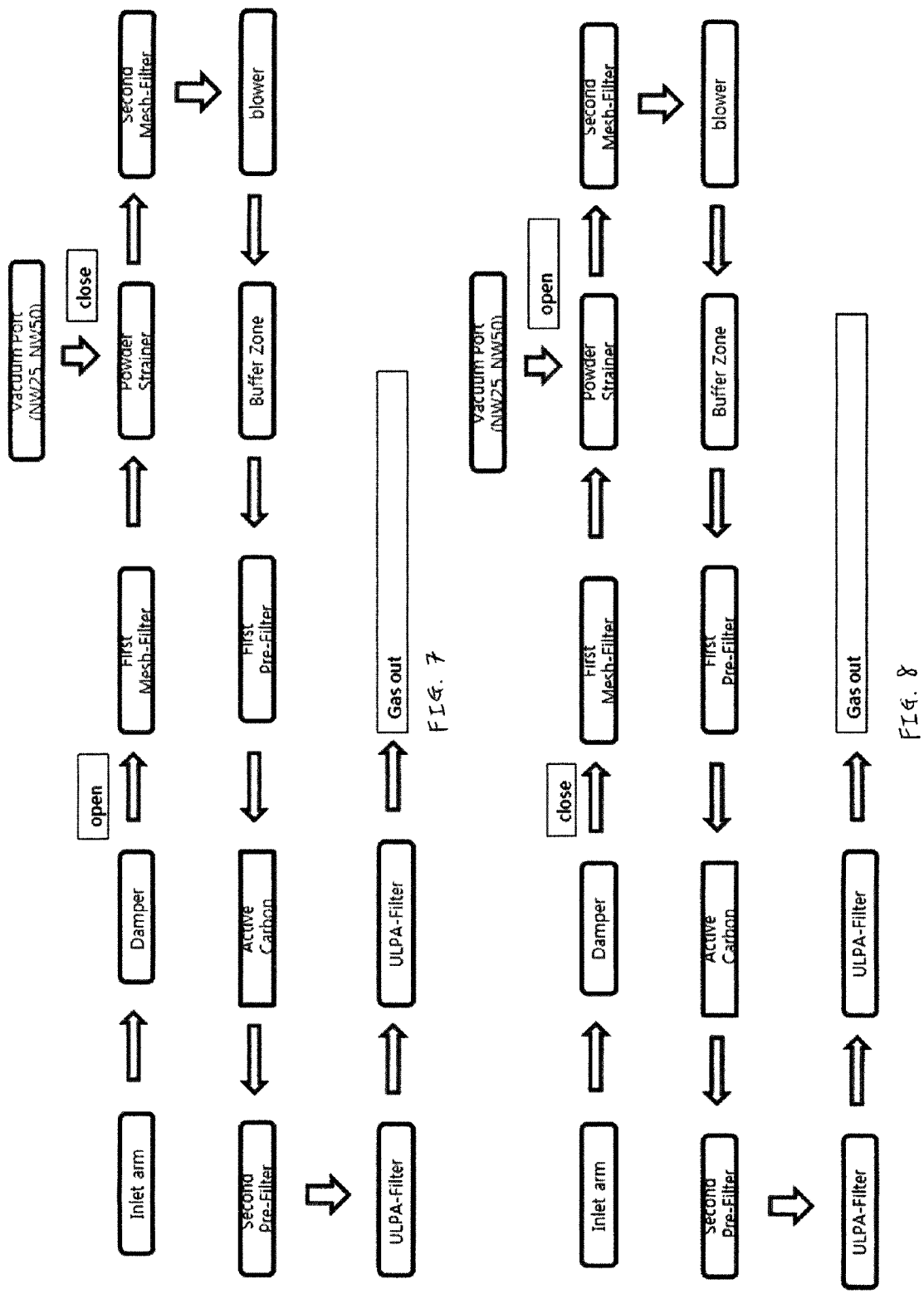
FIG. 7 is a diagram showing gas flow starting from the arm hood.
FIG. 8 is a diagram showing gas flow starting from a gas flow-in port.
Figure 9:
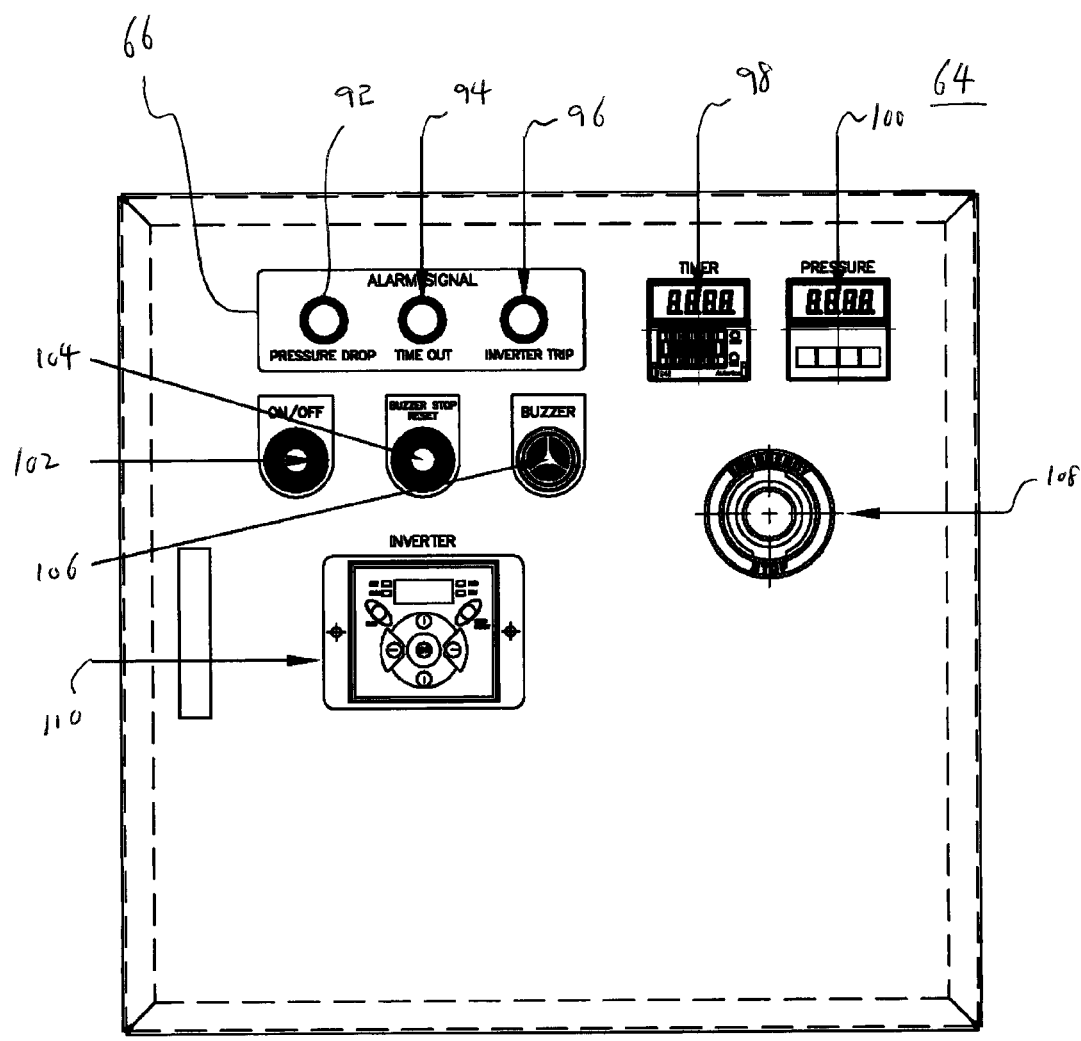
FIG. 9 is an elevation view of an external panel of an electric control device.

FIG. 7 shows the gas flow path in the portable dry scrubber 10 when gas is sucked with the arm hood 48. FIG. 8 shows the gas flow path in the portable dry scrubber 10 when gas is sucked with one of the gas flow-in ports 49, 50, 51.

The above description is illustrative and is not restrictive, and, as it will become apparent to those skilled in the art upon review of the disclosure, the present invention may be embodied in other specific forms without departing from the essential characteristics thereof. The scope of the invention should, therefore, be determined not with reference to the above description, but instead should be determined with reference to the following and pending claims along with their full scope of equivalents.

The invention claimed is:

1. A portable dry scrubber comprising:
   a) a gas flow control module comprising a gas receiving unit that is adapted to receive inflow of gas from surrounding atmosphere or from a gas source, wherein the inflow of gas contains hazardous materials;
   b) a gas processing module that removes hazardous matter from the gas flowed in through the gas receiving unit; and
   c) a connection module that connects the gas flow control module detachably to the gas processing module, wherein the gas processing module comprises a hazardous matter removing unit that removes hazardous matter from the gas that passes through the hazardous matter removing unit, wherein the connection module comprises a quick coupling device that establishes and disassembles a gas flow passage between the gas flow control module and the gas processing module, wherein the gas receiving unit comprises an articulating arm hood, one or more gas flow-in ports and a gas suction pump, wherein the gas suction pump sucks gas through the arm hood or the gas flow-in ports, wherein the gas flow-in ports have different diameters.

2. A portable dry scrubber comprising:
   a) a gas flow control module comprising a gas receiving unit that is adapted to receive inflow of gas from surrounding atmosphere or from a gas source, wherein the inflow of gas contains hazardous materials;
   b) a gas processing module that removes hazardous matter from the gas flowed in through the gas receiving unit; and
   c) a connection module that connects the gas flow control module detachably to the gas processing module, wherein the gas processing module comprises a hazardous matter removing unit that removes hazardous matter from the gas that passes through the hazardous matter removing unit, wherein the connection module comprises a quick coupling device that establishes and disassembles a gas flow passage between the gas flow control module and the gas processing module, wherein the gas receiving unit comprises an articulating arm hood, one or more gas flow-in ports and a gas suction pump, wherein the gas suction pump sucks gas through the arm hood or the gas flow-in ports, wherein the gas receiving unit further comprises a powder strainer, wherein gas that flows in through the arm hood or the gas flow-in ports flows through the powder strainer, a first connection pipe that passes the gas out of the powder strainer into the gas suction pump, a second connection pipe that passes the gas out of the gas suction pump into the hazardous matter removing unit, wherein the gas receiving unit further comprises a by-pass pipe and a by-pass 3 way valve, wherein the by-pass 3 way valve controls the flow inside the gas receiving unit to occur along the first connection pipe and the second connection pipe, along the first connection pipe and the by-pass pipe, or along the by-pass pipe and the second connection pipe.

3. The portable dry scrubber of claim 2, wherein the gas flow control module further comprises an electric control device that controls the operation of the gas receiving unit, wherein the electric control device has an alarm device that monitors extraordinary situation and emits a warning alarm when extraordinary situation is detected.

4. The portable dry scrubber of claim 3, wherein the extraordinary situation monitored by the alarm device comprises pressure drop, time out or inverter trip.

5. The portable dry scrubber of claim 4, wherein the quick coupling device comprises a quick release vacuum flange, wherein the gas receiving comprises a connecting flange that engages with the quick release vacuum flange, wherein the gas flow control module comprises a substantially rectangular control case, wherein the gas processing module comprises a substantially rectangular processing case that a comprises a top panel, a bottom panel and four side panels that connect the top panel and the bottom panel, wherein the connection module further comprises a plurality of protrusions that engage with the control case, wherein the hazardous matter removing unit comprises one or more beds of adsorbents, wherein the adsorbents remove $SiCl_2H_2$, $SiH_4$, $NH_3$, $AsH_3$, $PH_3$, $BF_3$, $ClF_3$, TEOS, CO, $BCl_3$, $Cl_2$, HBr, HCl, or HF, wherein the gas processing module further comprises a periodic maintenance port that allows access into the gas processing module, a buffer zone that comprises a plenum adjacent to the beds of adsorbents, and a ULPA filter, wherein the gas flowed into the gas processing module via the vacuum flange flows through the buffer zone, the beds of adsorbents, the ULPA filter and is exhausted from the gas processing module, wherein the gas flow-in ports have different diameters, wherein the gas processing module further comprises a gas detecting view port provided on the side panel, wherein the gas detecting view port allows watching the state of adsorbents in the beds of adsorbents.

* * * * *